United States Patent
Nakaya et al.

(10) Patent No.: US 9,758,663 B2
(45) Date of Patent: Sep. 12, 2017

(54) THERMOPLASTIC RESIN POWDER AND METHOD FOR PRODUCING SAME

(71) Applicant: Mitsubishi Rayon Co., Ltd., Tokyo (JP)

(72) Inventors: Fuminori Nakaya, Otake (JP); Junichi Abe, Otake (JP)

(73) Assignee: Mitsubishi Chemical Corporation, Tokyo (JP)

( * ) Notice: Subject to any disclaimer, the term of this patent is extended or adjusted under 35 U.S.C. 154(b) by 39 days.

(21) Appl. No.: 14/758,995

(22) PCT Filed: Jan. 6, 2014

(86) PCT No.: PCT/JP2014/050033
§ 371 (c)(1),
(2) Date: Jul. 2, 2015

(87) PCT Pub. No.: WO2014/106952
PCT Pub. Date: Jul. 10, 2014

(65) Prior Publication Data
US 2015/0337127 A1   Nov. 26, 2015

(30) Foreign Application Priority Data

Jan. 7, 2013 (JP) .................. 2013-000443
Jul. 11, 2013 (JP) .................. 2013-145618

(51) Int. Cl.
| | | |
|---|---|---|
| C08F 6/22 | (2006.01) | |
| C08L 33/08 | (2006.01) | |
| C08L 33/14 | (2006.01) | |
| C08J 5/18 | (2006.01) | |
| C08J 3/16 | (2006.01) | |
| C08K 3/30 | (2006.01) | |

(52) U.S. Cl.
CPC ............... *C08L 33/08* (2013.01); *C08F 6/22* (2013.01); *C08J 3/16* (2013.01); *C08J 5/18* (2013.01); *C08L 33/14* (2013.01); *C08J 2333/06* (2013.01); *C08K 2003/309* (2013.01); *C08K 2003/3081* (2013.01)

(58) Field of Classification Search
CPC .. C08L 33/08; C08L 33/14; C08F 6/22; C08J 3/16; C08J 5/18; C08J 2333/06; C08K 2003/3081; C08K 2003/309
USPC .......................................................... 524/833
See application file for complete search history.

(56) References Cited

U.S. PATENT DOCUMENTS 4,508,875 A    4/1985   Kishida et al.

FOREIGN PATENT DOCUMENTS

| | | |
|---|---|---|
| JP | 62-19309 B2 | 4/1987 |
| JP | 2000-026526 A | 1/2000 |
| JP | 2000026526 A * | 1/2000 |
| JP | 2003-292527 A | 10/2003 |
| JP | 2003-342321 A | 12/2003 |
| JP | 2008-255240 A | 10/2008 |
| JP | 2008-266358 A | 11/2008 |
| JP | 2010-241966 A | 10/2010 |
| WO | 2009/60936 A1 | 5/2009 |

* cited by examiner

*Primary Examiner* — Kelechi Egwim
(74) *Attorney, Agent, or Firm* — Morgan, Lewis & Bockius LLP

(57) ABSTRACT

The objective of the present invention is to provide a thermoplastic resin powder that suppresses a decrease in fluidity of a composition during melt molding and that has a suppressed alteration of the resin resulting from retention. The thermoplastic resin powder is obtained by coagulating a polymer from a latex produced by means of emulsion polymerization of a monomer, the content of metal-corroding free acids in the thermoplastic resin powder is no greater than 500 ppm, and the thermoplastic resin powder satisfies a predetermined formula (1).

13 Claims, 2 Drawing Sheets

THERMOPLASTIC RESIN POWDER AND METHOD FOR PRODUCING SAME

TECHNICAL FIELD

The present invention relates to a thermoplastic resin powder and a method for producing the same. Furthermore, the present invention preferably relates to a thermoplastic resin powder in which degradation caused by a decrease in fluidity of a resin can be suppressed even during melt molding and a method for producing the same.

BACKGROUND ART

An acrylic resin molded product consisting of a rubber-containing acrylic resin is widely used. In particular, an acrylic resin film has excellent transparency, weather resistance, flexibility, and processability, and it is laminated on a surface of various resin molded products, wood products, and metal molded products. Examples of the specific use include a surface material, a marking film, or a film for coating a highly luminescent reflecting material to be used as a constructional material including an interior material for an automobile, furniture, door material, windshield, dust-cloth container, an interior material for bathroom, or the like.

The acrylic resin is produced by emulsion polymerization, for example. Furthermore, as a method for obtaining a polymer from emulsion-polymerized latex containing a polymer, a method of obtaining a resin with excellent weather resistance, water whitening resistance, or the like by using aluminum sulfate as a coagulating agent is disclosed in Patent Document 1. Furthermore, the use of sulfuric acid as a coagulating agent is disclosed in Patent Document 2.

CITATION LIST

Patent Document

Patent Document 1: JP 62-19309 B
Patent Document 2: JP 2008-255240 A
Patent Document 3: JP 2010-241966 A

DISCLOSURE OF THE INVENTION

Problem to be Solved by the Invention

Because the method suggested in the above Patent Documents 1 and 2 requires the use of a large amount of aluminum sulfate or sulfuric acid, a step of washing sufficiently the obtained thermoplastic resin powder is necessary. If the washing is insufficient, fluidity of the thermoplastic resin powder or a thermoplastic resin composition containing the thermoplastic resin powder decreases over time so that it can easily remain inside an extruder. Accordingly, a problem like degradation of a resin or the like may occur. Furthermore, when a degraded resin is incorporated in a molded product, fish eyes are generated as caused by a degraded resin to yield poor appearance of a molded product. Furthermore, as the resin remains inside an extruder, there is also a problem of having lower productivity due to a need for performing replacement operation for a long period time or dismembering and cleaning frequently an apparatus to prevent incorporation of previous resin for the case of having resin change.

To solve those problems, a method of preventing a decrease in fluidity by adding a phosphate compound to a resin is disclosed in Patent Document 3. However, when a resin suggested by the method of Patent Document 3 is molded by using an extruder, there is a possibility that an extruder is corroded by phosphoric acid contained in the resin, and thus it is desired to develop other methods.

Accordingly, an object of the present invention is to provide a thermoplastic resin powder in which a decrease in fluidity during melt molding is suppressed so as to suppress degradation caused by retention.

Means for Solving Problem

Thus, one embodiment of the present invention is expressed as follows.

[1] A thermoplastic resin powder obtained by coagulating a polymer from a latex produced by means of emulsion polymerization of a monomer, in which the content of metal corroding free acids in the thermoplastic resin powder is no greater than 500 ppm, and the thermoplastic resin powder satisfies the following Formula (1);

$$75 \leq \text{flow retention rate (\%)} \leq 200 \quad (1)$$

with the proviso that the above flow retention rate is defined by $(MFR_{20}/MFR_4) \times 100$, $MFR_{20}$ indicates melt flow rate after maintaining for 20 minutes at conditions including 250° C. and a load of 49 N, and $MFR_4$ indicates melt flow rate after maintaining for 4 minutes at conditions including 250° C. and a load of 49 N.

[2] The thermoplastic resin powder according to [1], which satisfies the following Formula (2)

$$90 \leq \text{flow retention rate (\%)} \leq 120 \quad (2).$$

The thermoplastic resin powder according to [1] or [2], in which the monomer contains (meth)acrylic acid ester at 50 to 100% by mass.

[4] The thermoplastic resin powder according to any one of [1] to [3], in which calcium content is less than 50 ppm.

[5] The thermoplastic resin powder according to [4], in which sum of the calcium content and magnesium content is less than 50 ppm.

[6] The thermoplastic resin powder according to any one of [1] to [5], in which aluminum content is 60 ppm or more and 300 ppm or less.

[7] The thermoplastic resin powder according to any one of [1] to [6], in which phosphorus content is 50 ppm or more.

[8] A method for producing a thermoplastic resin powder including:

an emulsion polymerization step for obtaining a latex containing the polymer by emulsion polymerization of the monomer; and a coagulation step for coagulating the polymer by contacting a solution containing aluminum sulfate at 0.03 to 0.9 part by mass relative to 100 parts by mass of the polymer with the latex.

[9] A method for producing a thermoplastic resin powder including:

an emulsion polymerization step for obtaining a latex containing the polymer by emulsion polymerization of the monomer; and a coagulation step for coagulating the polymer by contacting a solution containing sulfuric acid at 0.1 to 2.0 parts by mass relative to 100 parts by mass of the polymer with the latex.

[10] The method for producing a thermoplastic resin powder according to [8] or [9], in which carboxylic acid salt or phosphoric acid ester salt is used as an emulsifying agent during the emulsion polymerization step.

[11] The method for producing a thermoplastic resin powder according to [10], in which the phosphoric acid ester salt is represented by the following Formula (I);

[Chem. 1]

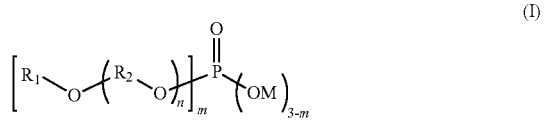

[in Formula (I), $R_1$ represents a linear or branched and substituted or unsubstituted alkyl group with 10 to 18 carbon atoms, $R_2$ represents a linear or branched and substituted or unsubstituted alkylene group with 2 or 3 carbon atoms, M represents an alkali metal or an alkali earth metal, m represents 1 or 2, and n represents an integer from 1 to 20].

[12] The thermoplastic resin powder according to any one of [1] to [7], in which the thermoplastic resin powder does not contain butadiene as a copolymerization component.

[13] A resin molded product obtained by molding a thermoplastic resin composition which contains the thermoplastic resin powder according to any one of [1] to [7].

[14] The resin molded product according to [13], in which the resin molded product has a film shape.

Meanwhile, as described herein, aluminum sulfate indicates aluminum sulfate hexadecahydrate.

Effect of the Invention

It is possible to provide the thermoplastic resin powder of the present invention in which a decrease in fluidity during melt molding is suppressed so as to suppress degradation resulting from retention.

Furthermore, according to the production method of the present invention, drying efficiency is high when a polymer is obtained and dried from a polymer latex, and thus productivity is high.

MODE(S) FOR CARRYING OUT THE INVENTION

Figure 1:
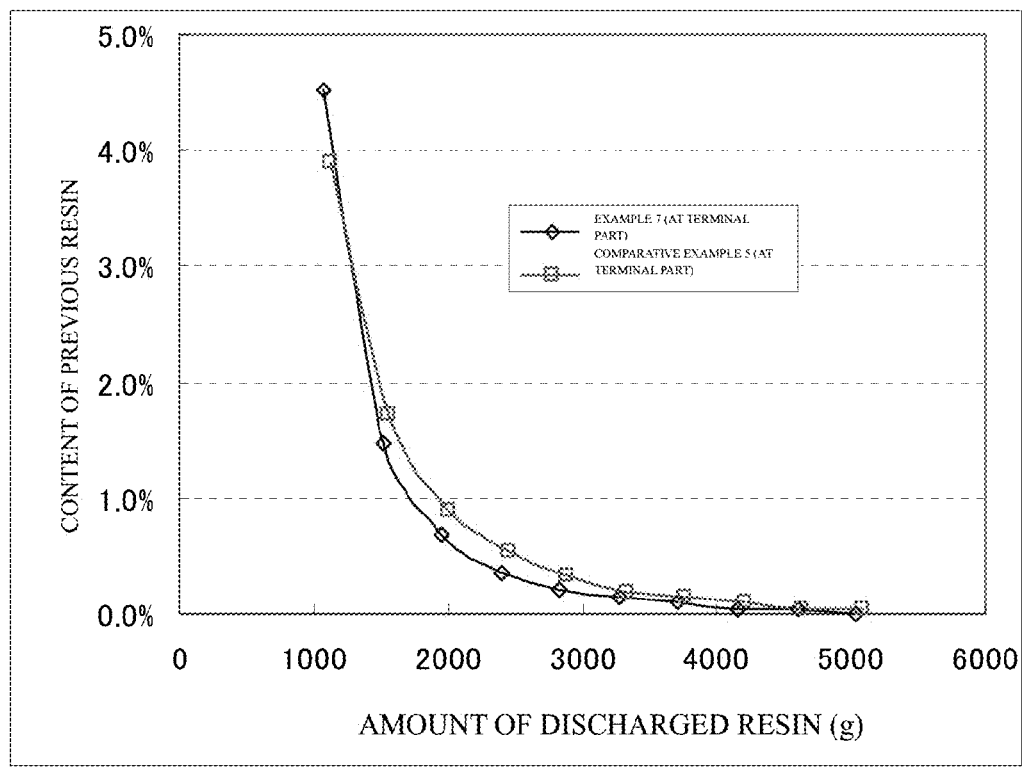
FIG. 1 is a graph illustrating the results of evaluating the retention in Examples and Comparative Examples.

As a result of carrying out intensive studies, the inventors of the present invention found that the fluidity of a thermoplastic resin powder or a composition containing the thermoplastic resin powder is lowered in an extruder due to the reasons that the polyvalent metal ions included in a coagulating agent remain in the thermoplastic resin powder and an ionic cross-linking between polymer chains constituting a thermoplastic resin is formed by them. It was also found that, when melt molding is performed by using, as a molding material, a thermoplastic resin composition in which decrease in fluidity over time is suppressed, generation of foreign materials is suppressed so that a molded product with excellent appearance is obtained. The present invention is achieved accordingly.

This embodiment relates to a thermoplastic resin powder which is obtained by coagulating a polymer from a latex produced by a means of emulsion polymerization of a monomer, in which the content of metal corroding free acids is no greater than 500 ppm in the thermoplastic resin powder, and the flow retention rate is 75 to 200%. As the flow retention rate gets closer to 100%, less fluctuating fluidity is obtained. From the viewpoint of reducing the foreign materials which become a cause of a fish eye, the flow retention rate is preferably 90% or more. From the viewpoint of preventing foaming or deterioration of dynamic properties caused by thermal decomposition, it is preferably 120% or less.

The flow retention rate is defined as $(MFR_{20}/MFR_4) \times 100$. Furthermore, when the melt flow rate is measured at conditions including 250° C. and a load of 49 N, the value obtained by measuring after maintaining for 20 minutes at 250° C. corresponds to ($MFR_{20}$), and the value obtained by measuring after maintaining for 4 minutes at 250° C. corresponds to ($MFR_4$).

According to this embodiment, the monomer constituting the thermoplastic resin powder preferably contains (meth) acrylic acid ester in an amount of 50 to 100% by mass. If the monomer constituting the thermoplastic resin powder preferably contains (meth)acrylic acid ester in an amount of 50 to 100% by mass, a molded product consisting of a thermoplastic resin composition which contains the thermoplastic resin powder can have good appearance, optical properties, dynamic properties, or the like, and thus has a high industrial value.

According to this embodiment, the amount of polyvalent metal ions that are included in resin powder is reduced to achieve the aforementioned flow retention rate. To do so, it is important to suppress the use amount of a coagulating agent so that the use amount is less than the use amount of a related art, and it is preferable to select a coagulating agent which has a high coagulating property even at a small amount. Preferred examples of the coagulating agent include sulfuric acid and aluminum sulfate. Examples of the polyvalent metal ions that need to be reduced include an element of Group 2 such as calcium or magnesium. The content of calcium in the thermoplastic resin powder is preferably less than 50 ppm. Furthermore, the sum of calcium content and magnesium content in thermoplastic resin powder is preferably less than 50 ppm.

If a coagulating agent containing aluminum is used, the aluminum content in the thermoplastic resin powder is preferably 60 to 300 ppm. When the aluminum content is 300 ppm or less, the flow retention rate of a thermoplastic resin powder is further improved. When the aluminum content is 60 ppm or more in the thermoplastic resin powder obtained by using a coagulating agent containing aluminum, the moisture ratio of wet component after a coagulation step can be lowered, and thus the drying step can be simplified.

According to the present embodiment, phosphorus content in the thermoplastic resin powder is preferably 50 ppm or more and 1000 ppm or less. When the phosphorus content is 50 ppm or more in the thermoplastic resin powder obtained by using phosphoric acid ester salt as an emulsifying agent, the hot water whitening resistance of the molded product is improved. When the phosphorus content is 1000 ppm or less, coloration of the molded product to be obtained can be further suppressed.

The thermoplastic resin powder according to the present embodiment exhibits only a small decrease in fluidity during melt molding, and thus degradation of a resin caused by retention is suppressed. More specifically, the thermoplastic resin powder according to the present embodiment exhibits only a small decrease in fluidity during melt molding, and thus it is unlikely to have an occurrence of retention that is caused by decreased fluidity. As such, it is unlikely for the thermoplastic resin powder according to the present embodiment to have an occurrence of resin degradation caused by retention. Accordingly, by using the thermoplastic resin powder according to the present embodiment, foreign materials as a cause of fish eye can be reduced. Furthermore, by using a thermoplastic resin composition which contains the thermoplastic resin powder according to the present embodiment, foreign materials as a cause of fish eye can be reduced. Furthermore, as the amount of the metal corroding free acids contained in the thermoplastic resin powder is low, corrosion of an extruder is reduced. Content of the metal corroding free acids relative to the thermoplastic resin powder is 500 ppm or less, and preferably 100 ppm or less from the viewpoint of further reducing the corrosion of an extruder.

Hereinbelow, a preferred mode for producing the thermoplastic resin powder of the embodiment of the present invention is described.

<Emulsion Polymerization Step>

In this embodiment, examples of the emulsion polymerization latex include a latex containing a polymer such as poly(meth)acrylate, polybutadiene, styrene-butadiene copolymer, or styrene-butadiene-acrylonitrile copolymer. Furthermore, from the viewpoint of the appearance of a resin molded product, an acryl latex containing the (meth)acrylate component at 50% by mass or more, that is, emulsion polymerization latex containing an acrylic resin, is preferably used. Furthermore, the polymer may be a polymer with single layer structure or a polymer with multilayer structure or a multi-stage polymer consisting of plural layers. Furthermore, the emulsion polymerization step may have a single step or two or more steps.

Furthermore, the polymer is preferably a multi-stage polymer which is obtained by performing at least one stage of polymerization by supplying the monomer (b) (described below) to acryl latex having the acrylic rubber (A) (described below) dispersed in water.

Examples of the (meth)acrylate include methyl acrylate, ethyl acrylate, n-propyl acrylate, n-butyl acrylate, 2-ethylhexyl acrylate, octyl acrylate, tridecyl acrylate, ethoxyethoxyethyl acrylate, methoxytripropylene glycol acrylate, 4-hydroxybutyl acrylate, lauryl acrylate, lauryl methacrylate, stearyl methacrylate, and tridecyl methacrylate. It may be used either singly or in combination of two or more types.

<Acryl Rubber (A)>

The acryl rubber (A) is preferably a polymer having glass transition temperature of 0° C. or lower –150° C. or higher, from the viewpoint of exhibiting impact resistance. From such point of view, preferred examples of (meth)acylate particularly include alkyl(meth)acrylate such as n-butyl acrylate, 2-ethylhexyl acrylate, octyl acrylate, lauryl acrylate, tridecyl acrylate, lauryl methacrylate, or tridecyl methacrylate. Furthermore, when (meth)acrylate having crystallinity near room temperature [for example, stearyl methacrylate or the like] is used, it can be used as a mixture with a monomer which can dissolve it. As the acrylic resin used for the method for producing thermoplastic resin powder according to this embodiment, at least one selected from the above (meth)acrylates is used at 50% by mass or more, and if necessary, a homopolymer or a copolymer which can be obtained by using acrylic acid ester having an alkyl group with 1 to 8 carbon atoms, vinyl acetate, vinyl chloride, styrene, acrylonitrile, methacrylonitrile, or butadiene as a copolymerizable compound, and an acryl rubber-containing polymer having the alkyl(meth)acrylate as a main component can be used. Among them, from the viewpoint of having excellent weather resistance, those not containing butadiene are preferable.

Furthermore, as a raw material of the acryl rubber (A), it is preferable to use the monomer (a). The monomer (a) contains alkyl acrylate at 20% by mass or more on the basis of total amount of 100% by mass of the monomer (a). Furthermore, the monomer (a) becomes a raw material of the first stage polymerization. According to the first polymerization step in which the polymerization is performed by using the monomer (a) as a raw material, the acryl rubber (A) is produced. The monomer (a) may contain alkyl acrylate at 100% by mass or it may be a monomer mixture containing a monomer other than alkyl acrylate.

Examples of the alkyl acrylate (hereinbelow, it may be referred to as "the monomer (a1)") include methyl acrylic acid, ethyl acrylic acid, propyl acrylic acid, n-butyl acrylic acid, 2-ethylhexyl acrylic acid, and n-octyl acrylic acid. Among them, n-butyl acrylic acid is preferable. It may be used either singly or in combination of two or more types.

Examples of the monomer other than alkyl acrylate in the monomer (a) include alkyl methacrylate (hereinbelow, it may be referred to as "the monomer (a2)"), a monomer having one double bond which can copolymerize with them (alkyl acrylate and alkyl methacrylate) (hereinbelow, it may be referred to as "the monofunctional monomer (a3)"), and the polyfunctional monomer having two or more double bonds which can copolymerize with them (alkyl acrylate and alkyl methacrylate) (hereinbelow, it may be referred to as "the polyfunctional monomer (a4)").

The alkyl group in alkyl methacrylate may be linear or branched. Specific examples of the alkyl methacrylate include methyl methacrylate, ethyl methacrylate, propyl methacrylate, and n-butyl methacrylate. These may be used either singly or in combination of two or more types.

Examples of the monofunctional monomer (a3) include an acryl monomer such as lower alkoxy acrylic acid, cyanoethyl acrylic acid, acrylamide, and (meth)acrylic acid; an aromatic vinyl monomer such as styrene or alkyl substituted styrene; and a vinyl cyanide monomer such as acrylonitrile and methacrylonitrile. These may be used either singly or in combination of two or more types.

Examples of the polyfunctional monomer (a4) include a cross-linkable monomer which has at least two copolymerizable double bonds per molecule. Specific examples of the polyfunctional monomer (a4) include the followings: di(meth)acrylic acid alkylene glycol such as di(meth)acrylic acid ethylene glycol, di(meth)acrylic acid 1,3-butylene glycol, di(meth)acrylic acid 1,4-butylene glycol, or di(meth)acrylic acid propylene glycol; polyvinylbenzene such as divinylbenzene or trivinylbenzene; cyanurate monomer such as triallyl cyanurate or triallyl isocyanurate; allyl, methallyl or crotyl ester of α,β-unsaturated carboxylic acid or dicarboxylic acid such as allyl methacrylate. These may be used either singly or in combination of two or more types.

The content of the alkyl acrylate in the monomer (a) is preferably 20 to 99.9% by mass, and more preferably 30 to 99.9% by mass. The content of the alkyl methacrylate in the monomer (a) is preferably 0 to 69.9% by mass. The content of the monofunctional monomer (a3) in the monomer (a) is preferably 0 to 20% by mass. The content of the polyfunctional monomer (a4) in the monomer (a) is preferably 0.1 to 10% by mass.

The glass transition temperature of the acryl rubber (A) (hereinbelow, it may be referred to as "Tg") is, from the viewpoint of flexibility for use as a film, for example, more preferably 0 to –60° C. Meanwhile, the Tg described in the present invention indicates the value calculated from the following FOX equation by using the values described in Polymer HandBook [(J. Brandrup, Interscience, 1989)]. In addition, the content of the acryl rubber (A) in the polymer is preferably 5 to 70% by mass from the viewpoint of a film forming property of a polymer for use as a film or the like.

$$1/(273+Tg)=\Sigma(w_i/(273+Tg_i))$$

In the above equation, Tg (° C.) indicates the glass transition temperature of a copolymer, $w_i$ indicates a mass fraction of monomer i as a raw material of a copolymer, and $Tg_i$ indicates the glass transition temperature (° C.) of a homopolymer that is obtained by polymerization of the monomer i.

<Monomer (b)>

The monomer (b) contains alkyl methacrylate in an amount of 50% by mass or more on the basis of 100% by mass of the total amount of the monomer (b). The monomer (b) is a raw material of the last stage polymerization, and it constitutes the outer layer of a polymer after polymerization. The monomer (b) may contain alkyl methacrylate at 100% by mass or it may be a monomer mixture which contains a monomer other than alkyl methacrylate.

Tg of a polymer composed only of the monomer (b) is preferably 70 to 120° C., and more preferably 80 to 100° C. As for the alkyl methacrylate in the monomer (b), one or two or more types of the monomer exemplified as "the monomer (a2)" in the explanation of the monomer (a) can be used. Examples of the monomer other than alkyl methacrylate in the monomer (b) include alkyl acrylate and a monomer (hereinbelow, it may be referred to as "the monofunctional monomer (b3)") which has one double bond copolymerizable with them. As for the alkyl acrylate, one or two or more types of the monomer exemplified as "the monomer (a1)" can be used. As for the monofunctional monomer (b3), one or two or more types of the monomer exemplified as "the monofunctional monomer (a3)" can be used.

The content of alkyl methacrylate in the monomer (b) is 50 to 100% by mass, preferably 51 to 100% by mass, and more preferably 60 to 100% by mass. The content of alkyl acrylate in the monomer (b) is preferably 0 to 20% by mass. The content of the monofunctional monomer (b3) in the monomer (b) is preferably 0 to 49% by mass, and more preferably 0 to 40% by mass.

The use amount of the monomer (b) in the 100% by mass of the total amount of monomers that are used for entire steps of the polymerization of the present invention is, from the viewpoint of the film forming property of a polymer for use as a film, impact resistance of a film obtained by using the polymer for use as an impact strength modifier, or the like, preferably 30 to 95% by mass.

As for the means for performing emulsion polymerization, a known polymerization apparatus can be used. Examples of the polymerization apparatus include a polymerization tank equipped with a stirrer. When a graft copolymer is produced by graft polymerization of a monomer having a hard polymer-forming property with a rubber-like polymer, a polymerization apparatus equipped with a rubber polymerization tank and at least one graft polymerization tank can be used, for example.

As for the emulsifying agent used for emulsion polymerization (also referred to as a surface active agent), an anionic, a cationic, or a nonionic surface active agent can be used, for example. Among them, an anionic surface active agent is preferable. Examples of the anionic surface active agent include carboxylic acid salt such as rosin acid soap, potassium oleate, sodium stearate, sodium myristate, sodium N-lauroylsarsocinate, dipotassium alkenyl succinate, sodium polyoxyalkylene alkyl ether carboxylic acid, sulfuric acid ester salt such as sodium lauryl sulfate, sulfonic acid salt such as sodium dioctyl sulfosuccinate, sodium dodecylbenzene sulfosuccinate, sodium alkyl diphenyl ether disulfonate, sodium polyoxyalkylene alkyl ether sulfate, and phosphoric acid ester salt such as sodium polyoxyalkylene alkylphenyl ether phosphate. The emulsifying agent can be used either singly or in combination of two or more types.

Among them, from the viewpoint of improving the hot water whitening resistance, the emulsifying agent is preferably phosphoric acid ester salt or carboxylic acid salt, and a compound having, in the molecule, a group represented by the —$PO_3M_2$, —$PO_2M$ (with the proviso that, M is an alkali metal or an alkali earth metal) is preferable, and phosphoric acid ester salt or polyoxyalkylene alkyl ether carboxylic acid salt represented by the following Formula (I) is preferable. By using a salt of weak acid such as phosphoric acid ester salt and carboxylic acid salt as an emulsifying agent, the use amount of the coagulating agent can be reduced.

[Chem. 2]

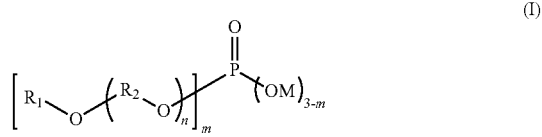

(I)

In Formula (I), $R_1$ represents a linear or branched and substituted or unsubstituted alkyl group having 10 to 18 carbon atoms, $R_2$ represents a linear or branched and substituted or unsubstituted alkylene group having 2 or 3 carbon atoms, M represents alkali metal or alkali earth metal, m is 1 or 2, and n is an integer of from 1 to 20.

Examples of the substituent for the alkyl group or alkylene group include an aryl group having 6 to 10 carbon atoms (for example, a phenyl group and a naphthyl group) and a linear or branched alkyl group having 1 to 6 carbon atoms (for example, a methyl group, an ethyl group, a propyl group, an isopropyl group, and a butyl group).

As for phosphoric acid ester salt, an alkali metal salt or an alkali earth metal salt of alkylpolyoxyalkylene phosphoric acids such as mono-n-butylphenylpentaoxyethylene phosphoric acid, di-n-butylphenylpentaoxyethylene phosphoric acid, mono-n-pentylphenylhexaoxyethylene phosphoric acid, di-n-pentylphenylhexaoxyethylene phosphoric acid, mono-n-heptylphenylpentaoxyethylene phosphoric acid, di-n-heptylphenylpentaoxyethylene phosphoric acid, mono-n-pentyloxyheptaoxyethylene phosphoric acid, di-n-pentyloxyheptaoxyethylene phosphoric acid, mono-n-hexyloxypentaoxyethylene phosphoric acid, di-n-hexyloxypentaoxyethylene phosphoric acid, mono-n-dodecyltetraoxyethylene phosphoric acid, di-n-dodecyltetraoxyethylene phosphoric acid, mono-n-butylphenylpentaoxypropylene phosphoric acid, di-n-butylphenylpentaoxypropylene phosphoric acid, mono-n-pentylphenylhexaoxypropylene phosphoric acid, di-n-pentylphenylhexaoxypropylene phosphoric acid, mono-n-heptylphenylpentaoxypropylene phosphoric acid, di-n-heptylphenylpentaoxypropylene phosphoric acid, mono-n-pentyloxyheptaoxypropylene phosphoric acid, di-n-pentyloxyheptaoxypropylene phosphoric acid, mono-n-hexyloxypentaoxypropylene phosphoric acid, di-n-hexyloxypentaoxypropylene phosphoric acid, mono-n- dodecyltetraoxypropylene phosphoric acid, and di-n-dodecyltetraoxypropylene phosphoric acid is preferably used. The phosphoric acid ester salt can be used either singly or in combination of two or more types. By performing the emulsion polymerization using an emulsifying agent of Formula (I), the water whitening resistance of a thermoplastic resin to be obtained is improved, and thus when a molded product obtained by melt molding of the thermoplastic resin is kept in a high temperature and high humidity state, it can have good appearance.

Preferred examples of the carboxylic acid salt include an alkali metal salt or an alkali earth metal salt of higher fatty acid such as oleic acid and cow fat acid, alkylene succinic acid, polyoxyethylene lauryl ether acetic acid, and polyoxypropylene lauryl ether acetic acid. The carboxylic acid ester salt can be used either singly or in combination of two or more types.

As for the alkali metal, sodium or potassium is preferable. As for the alkali earth metal, calcium or barium is preferable.

Meanwhile, it is possible that each of the phosphoric acid ester salt and carboxylic acid salt is used in combination. It is also possible that a monoester and a diester of phosphoric acid ester salt are used as a mixture.

Furthermore, the content of the phosphoric acid ester salt or carboxylic acid salt is preferably adjusted depending on the type of a monomer for polymerization or polymerization conditions, or the like. However, according to this embodiment, the content of the phosphoric acid ester salt is, relative to 100 parts by mass of the monomer, preferably 0.1 to 10 parts by mass and more preferably 0.5 to 5 parts by mass. Furthermore, the content of the carboxylic acid ester salt is, relative to 100 parts by mass of the monomer, preferably 0.1 to 10 parts by mass and more preferably 0.5 to 5 parts by mass.

The monomer is subjected to emulsion polymerization in the presence of an emulsifying agent, and the emulsion polymerization can be performed with any monomer composition.

Examples of the radical polymerization initiator include, although not particularly limited thereto, peroxides such as benzoyl peroxide, cumene hydroperoxide, or hydrogen peroxide, an azo compound such as azobisisobutryonitrile, a persulfate compound such as ammonium persulfate or potassium persulfate, a perchloric acid compound, a perborate compound, and a redox-based initiator consisting of a combination of peroxides and a reductive sulfoxy compound.

The monomer and polymerization initiator or the like can be added by any method such as bulk addition method, divided addition method, continuous addition method, monomer addition method, and emulsion addition method. Among them, from the viewpoint of obtaining a homogeneous polymer by quickly having homogenous distribution of a monomer and a polymerization initiator in a reaction vessel, the emulsion addition method is preferable. By using the emulsion addition method, aggregation of polymer microparticles or generation of coarse particles can be suppressed. When an aggregate of polymer microparticles or coarse particles are present in an obtained resin powder, fish eyes may be formed in a molded product using it, in particular, a film-shape molded product, and thus the appearance may be impaired.

Furthermore, to have a smooth progress of the reaction, the reaction system can be flushed with nitrogen. Furthermore, to remove residual monomers, temperature of the reaction system can be raised after the termination of the reaction. A catalyst can be also added to the reaction system.

<Coagulation Step>

In the present embodiment, a polymer is coagulated from a latex produced by emulsion polymerization to obtain a thermoplastic resin powder.

Examples of the coagulating agent used for the coagulation step include various inorganic acids or organics acids, and their salts, for example, sulfuric acid, nitric acid, hydrochloric acid, acetic acid, aluminum sulfate, magnesium sulfate, sodium sulfate, sodium nitrate, aluminum chloride, calcium chloride, sodium chloride, potassium acetate, and sodium acetate. Among them, those containing halogen atoms such as hydrochloric acid and hydrochloric acid salt may infiltrate a production facility and a device in which an obtained thermoplastic resin is used, and thus those not containing halogen atoms are preferable. Furthermore, as coagulation can be achieved by using a small amount, aluminum sulfate or sulfuric acid is preferable. Furthermore, from the viewpoint of preventing thermal degradation caused by residual metals and decreased fluidity accompanied with the thermal degradation, sulfuric acid is more preferable.

It is preferable to use phosphoric acid ester salt as an emulsifying agent and aluminum sulfate as a coagulating agent. It is more preferable to use carboxylic acid salt as an emulsifying agent and aluminum sulfate or sulfuric acid as a coagulating agent.

The use amount of the coagulating agent is preferably 0.03 to 2.0 parts by mass relative to 100 parts by mass of the polymer in latex. When the use amount of the coagulating agent is less than 0.03 part by mass, the moisture ratio in the obtained polymer increases and also the polymer may not be stably obtained.

When aluminum sulfate is used as a coagulating agent, the use amount of aluminum sulfate is preferably 0.03 to 0.9 part by mass and more preferably 0.09 to 0.6 part by mass relative to 100 parts by mass of the polymer in latex. When the use amount of the coagulating agent is less than 0.03 part by mass, the moisture ratio in the obtained polymer increases and also the polymer may not be stably obtained. On the other hand, when the use amount is more than 0.9 part by mass, the fluidity retention rate may be lowered when the obtained polymer is melt by heating.

When sulfuric acid is used as a coagulating agent, the use amount of sulfuric acid is preferably 0.1 to 2.0 parts by mass relative to 100 parts by mass of the polymer in latex. From the viewpoint of lowering the amount of residual free acid, it is more preferably 0.1 to 1.5 parts by mass. When the use amount is less than 0.1 part by mass, the moisture ratio in the obtained polymer increases and also the polymer may not be stably obtained. Furthermore, when the use amount is more than 2.0 parts by mass, the residual amount of sulfuric acid increases and the fluidity retention rate may be lowered when the obtained polymer is melt by heating. In addition, the water resistance or heat and coloration resistance of the obtained polymer may be deteriorated.

Aluminum sulfate may be used in combination with other acids or salts, if necessary. However, in a basic region, as aluminum sulfate forms aluminum hydroxide with low water solubility according to combined use with other acids or salts, and thus it is preferable that other bases are not added.

The temperature for coagulating the polymer by adding a coagulating agent to a latex is preferably 30 to 100° C. The coagulated polymer can be washed with water in an amount of 1 to 100 times and dried by using a fluid type dryer or a compression dehydrator. The drying temperature and drying time can be suitably determined depending on the type of a polymer.

Examples of the method for contacting an emulsion polymerization latex with a coagulating agent is, although not particularly limited, generally, a method in which an aqueous solution of a coagulating agent is stirred and a latex is continuously added thereto followed by maintaining it for a certain period of time, and a method of continuously adding and mixing an aqueous solution of a coagulating agent and a latex at a constant ratio in a vessel equipped with a stirrer and continuously discharging a mixture containing the coagulated polymer and water from a vessel.

The amount of an aqueous solution of a coagulating agent during the coagulation step is, although not particularly limited, preferably 10 parts by mass or more and 500 parts by mass or less relative to 100 parts by mass of the emulsion polymerization latex.

<Melt Extrusion>

The thermoplastic resin composition of this embodiment contains a thermoplastic resin powder, and also, if necessary, a common blending agent. By using the thermoplastic resin composition, a thermoplastic resin pellet can be produced.

The content of the thermoplastic resin powder in the thermoplastic resin composition is, although not particularly limited, for example, 20% by mass or more, preferably 20 to 100% by mass, and more preferably 50 to 99% by mass.

Examples of the blending agent include a stabilizer, a lubricant, a processing aid, a plasticizer, an ant-impact aid, a filler, an anti-microbial agent, an anti-molding agent, a foaming agent, a releasing agent, an anti-static agent, a coloring agent, a deglossing agent, a UV absorbing agent, and a thermoplastic polymer. In particular, to improve the heat resistance of a molded product of an acrylic resin and scratch resistance of a surface of a molded product, it is preferable to add a thermoplastic polymer. Examples of the thermoplastic polymer include those containing 50% by mass or more of methyl methacrylate and 50% by mass or less of other vinyl monomer which can polymerize with it (preferably less than 50% by mass). Examples of other vinyl monomer which can copolymerize with methyl methacrylate include various linear or branched alkyl(meth)acrylate such as methyl acrylate, ethyl (meth)acrylate, propyl(meth)acrylate, and butyl (meth)acrylate, aromatic (meth)acrylate such as phenyl(meth)acrylate or benzyl (meth)acrylate, aromatic vinyl monomer such as styrene or t-methyl styrene, and various acrylamide monomers. It may be used either singly or in combination of two or more types. Specific examples of the thermoplastic polymer include non-cross-linked acrylic resin such as ACRYPET VH, ACRYPET MD, and ACRYPET MF that are manufactured by Mitsubishi Rayon Co., Ltd.

Meanwhile, the method for adding a blending agent include a method of supplying, together with a thermoplastic resin powder, a blending agent to a molding machine for obtaining a molded product, and a method of kneading a raw material mixture in which a blending agent is admixed in advance with a thermoplastic resin powder by using various kneaders. Examples of the kneader used for the latter method include a common monoaxial extruder and a biaxial extruder. As for the part of an extruder such as a barrel or a screw which is in contact with a resin, various stainless steel, chrome molybdenum steel, aluminum chrome molybdenum steel, or the like is used. If necessary, a nitridation treatment, a plating treatment, a thermal spraying method or the like is performed. However, when the thermoplastic resin powder contains metal corroding free acids in an amount of more than 500 ppm, the extruder may be corroded, and therefore undesirable. Furthermore, when pellets obtained by melt extrusion contain metal corroding free acids in an amount of more than 500 ppm, the extruder may be also corroded during melt molding process described below, and thus undesirable, either. Examples of the metal corroding free acids include, in addition to an acid stronger than weak acid (that is, acid dissociation constant pKa of 3 or less in an aqueous solution), an acid including hydrogen fluoride acid. Specific examples of the metal corroding free acids include inorganic acid such as sulfuric acid, sulfide acid, nitric acid, nitrous acid, hydrogen halide, oxyhalogen acid, chromic acids, phosphoric acid, and phosphorus acid, and alkyl ester thereof, and sulfonic acids such as alkyl sulfonic acid, aromatic sulfonic acid, and trifluoromethane sulfonic acid.

The temperature for melt extrusion of a thermoplastic resin composition can be suitably determined depending on the type of a polymer or the like. In the case of an acrylic resin, for example, it is 200° C. to 280° C.

<Molding of Thermoplastic Resin Pellets>

Examples of a method for molding thermoplastic resin pellets include, although not particularly limited, extrusion molding, injection molding, vacuum molding, blow molding, and compression molding.

<Film Molding Using Thermoplastic Resin Pellets>

When the thermoplastic resin pellets are acrylic resins and molded into a film among the resin molded products, a high industrial value is obtained. Examples of the use of an acrylic resin film include an agricultural vinyl house, a marking film, a poster, a wallpaper, a foaming sheet, vinyl chloride leather for outdoor use, a roof material of vinyl chloride plate, and an outdoor wall material such as a siding material, interior and exterior materials for an automobile, a coating substitute for furniture, an interior material for elevator, a rainfall gutter, a floor material, a corrugated iron sheet, a cosmetic column, a lighting, and a surface material of a member used for a place in which water is used, for example, bathroom and kitchen. Other examples include a protective film for a polarizing film which is used for a polarizer such as a heat insulating film and a liquid crystal display and a retardation film used for a retardation plate for viewing angle compensation or retardation compensation.

Examples of the method for molding into a film include, although not particularly limited, a melt extrusion method such as a solution casting method, a T die method, or an inflation method. Among them, the T die method is preferable from the economical point of view.

In the case of an acrylic resin film, the film thickness is preferably 10 to 500 µm, more preferably 15 to 200 µm, and even more preferably 40 to 200 µm, although it is not particularly limited thereto. When the acrylic resin film thickness is 10 to 500 µm, the film to be obtained has suitable toughness, and also the lamination property and second processability of the film to be obtained are improved.

The acrylic resin film can be used directly for various applications. Alternatively, it may be used after suitably laminated on a substrate. When a transparent acrylic resin film is laminated on a substrate, it can be used as a substitute of a clear coating, and thus color hue of a substrate can be exhibited. For this application to exhibit the color hue of a substrate, the acrylic resin film is more excellent than a polyvinyl chloride film or a polyester film in terms of transparency, depth feel, or high quality feel.

Examples of the substrate on which an acrylic resin film is laminated include a molded product consisting of various resins or metals or a wood product. The substrate preferably consists of a thermoplastic resin which can be adhered to an acrylic resin film by melting. Examples of the thermoplastic resin include an acrylonitrile-butadiene-styrene (ABS) resin, an acrylonitrile-styrene (AS) resin, a polystyrene resin, a polycarbonate resin, a vinyl chloride resin, an acrylic resin, a polyester resin, and a resin containing those resins as a main component. Among them, from the viewpoint of adhesiveness, an ABS resin, an AS resin, a polycarbonate resin, a vinyl chloride resin, or a resin containing those resins as a main component is preferable. Meanwhile, for a substrate consisting of a resin which is not easily adhered by melting such as polyolefin resin, it is possible that the acrylic resin film is laminated after suitably forming an adhesive layer.

For a case in which the substrate has a shape with flat surface and is made of a material allowing thermal fusion, the acrylic resin film can be laminated on a substrate by a known method such as heat lamination. In the case of a material not allowing thermal fusion, lamination can be made by using adhesives or by performing adhesion processing on one surface of an acrylic resin film.

For a case in which the substrate has a complex shape, the acrylic resin film can be laminated on a substrate by a known molding method such as insert molding in which an acrylic resin film which has been processed in advance to a predetermined shape is inserted to a mold for injection molding, and in-mold molding method in which vacuum molding is performed in a mold followed by injection molding.

Among them, according to an in-mold molding, the acrylic resin film is molded to have a three-dimensional shape by vacuum molding, and a resin as a material of a substrate is flown into the molded product by injection molding followed by integration. Since a laminate having an acrylic resin film on a surface layer can be easily obtained, the in-mold molding is preferably used. Furthermore, as the molding and injection molding of an acrylic resin film can be performed by one step, the workability and economic value are favorable so that the in-mold molding is preferred. The heating temperature for in-mold molding is the temperature which is higher than the temperature at which the acrylic resin film is softened, and it is preferably 70 to 170° C. When it is 70° C. or higher, favorable molding can be obtained. When it is 170° C. or lower, the molded product to be obtained has improved appearance or releasing property.

When the acrylic resin film is laminated on a substrate having protection of a substrate as one of the purposes, a UV absorbing agent is preferably added in order to provide an acrylic resin film with weather resistance. The molecular weight of the UV absorbing agent is preferably 300 or more, and more preferably 400 or more. When the molecular weight of the UV absorbing agent is 300 or higher, it is unlikely to have problems such as having roll contamination that are caused by adhesion of an acrylic resin on a transfer roll or the like during film production. As for the type of an UV absorbing agent, although not particularly limited, the benzotriazole-based with molecular weight of 400 or higher or the triazine-based with molecular weight of 400 or higher can be particularly preferably used. Specific examples of the benzotriazole-based include Tinuvin 234 manufactured by BASF and ADK STAB LA-31 manufactured by ADEKA CORPORATION. Specific examples of the triazine-based include Tinuvin 1577 manufactured by BASF.

Surface of the acrylic resin film can be subjected to a surface treatment such as coating to be given with various functions. Examples of the surface treatment include a printing treatment such as silk printing and inkjet printing, a metal deposition for having metallic feel or preventing reflection, sputtering, a wet plating treatment, a surface hardening treatment for improving surface hardness, a water repellent treatment to prevent contamination, a treatment for forming photocatalyst layer, an anti-dust treatment, an anti-static treatment for the purpose of blocking electromagnetic wave, a treatment for forming an anti-reflection layer, an anti-glare treatment, and a de-glossing treatment. As for the printing method, a single side printing treatment by which only one surface of an acrylic resin film is printed is preferable. Furthermore, when an acrylic resin film is adhered on a surface of a substrate, the back surface printing in which the print surface is disposed on a surface adhered to a substrate is preferable from the viewpoint of protecting the print surface or having high quality feel.

EXAMPLES

Hereinbelow, the present invention is described in view of the Examples, but the present invention is not limited to those Examples.

Meanwhile, the "parts" and "%" in Examples and Comparative Examples indicate "parts by mass" and "% by mass", respectively. Furthermore, the abbreviations in the production examples are described below.

Methyl methacrylate (MMA)
Methyl acrylate (MA)
n-Butyl acrylate (n-BA)
Allyl methacrylate (AMA)
1,3-Butylene glycol dimethacrylate (1,3-BD)
t-Butylhydroperoxide (t-BH)
Cumene hydroperoxide (CHP)
n-Octylmercaptan (n-OM)
Emulsifying agent (1): sodium mono-n-dodecyloxytetraoxyethylene phosphoric acid [Product name; Phosphanol RS-610NA, manufactured by TOHO Chemical Industry Co., Ltd.]
Ethylene diamine tetraacetic acid disodium salt (EDTA)
The emulsifying agent (2): 24% aqueous solution of sodium polyoxyethylene lauryl ether acetate [Product name; NEOHITENOL ECL-45, manufactured by Dai-ichi Kogyo Seiyaku Co., Ltd.]
Emulsifying agent (3): 28% aqueous solution of potassium alkenyl succinate [Product name; LATEMUL ASK, manufactured by Kao Corporation]
Emulsifying agent (4): sodium dialkylsulfosuccinate [Product name; PELEX OT-P, manufactured by Kao Corporation]
Emulsifying agent (5): sodium polyoxyethylene nonylphenyl ether phosphate [Product name; Phosphanol LO-529, manufactured by TOHO Chemical Industry Co., Ltd.]
LA-31RG: "ADK STAB LA-31RG" manufactured by ADEKA CORPORATION
LA-57: "ADK STAB LA-57" manufactured by ADEKA CORPORATION
TV234: "Tinuvin234" manufactured by BASF
Irg1076: "Irganox1076" manufactured by BASF
VH: "ACRYPET VH" manufactured by Mitsubishi Rayon Co., Ltd.

Evaluations were made according to the following method.

(1) Thermal Stability (Flow Retention Rate)

The obtained thermoplastic resin powder was tested in terms of MFR (melt flow rate) at heating time of 4 minutes and 20 minutes based on JIS K7210 (method A) by using a melt indexer (L243) manufactured by TECHNOL SEVEN CO., LTD. Then, the flow retention rate was obtained based on the following equation. Meanwhile, the conditions for measuring MFR include temperature of 250° C. and a load of 49 N, and the time interval for cutting a sample was either 60 seconds or 120 seconds depending on the MFR value of a sample.

Flow retention rate=[MFR value at heating time of 20 minutes (g/10 minutes)]/[MFR value at heating time of 4 minutes (g/10 minutes)]×100

(2) Mass Average Particle Diameter

The mass average particle diameter of a polymer latex was obtained by absorption spectroscopy.

(3) Glass Transition Temperature (Tg) of Each Layer of Rubber-Containing Multi-Stage Polymer and Rubber-Containing Polymer Calculation was made based on the FOX equation by using the values described in Polymer HandBook (J. Brandrup, Interscience, 1989).

(4) Moisture Ratio 5 g of an aggregate after dehydration was sampled in an aluminum dish and dried for 30 minutes using a heat dryer at 180° C. Then, from a change in weight before and after the drying, the moisture ratio was calculated.

(5) Total Light Transmission, Haze Value, and Whiteness

Total light transmission was measured based on JIS K7361-1, haze value was measured based on JIS K7316, and whiteness was measured based on JIS Z8715.

(6) Fish Eye

By using a fish eye counter manufactured by MEC Co., Ltd., fish eyes with surface area of 0.01 mm² or more were selected, and those derived from thermal degradation, namely, those not derived from foreign materials, and in other words, those having no profile were counted by an observation under a microscope. The area for detection was 0.12 m², and the counts were converted to the number per 1 m².

(7) Evaluation of Hot Water Whitening Resistance (Condition 1)

A film with a thickness of 75 μm was immersed for 72 hours in hot water at 80° C. followed by keeping in a normal state for 24 hours. Then, the total light transmission, haze value, and whiteness were measured before and after the test.

(8) Evaluation of Hot Water Whitening Resistance (Condition 2)

A film with a thickness of 50 μm was immersed for 30 minutes in hot water at 100° C. followed by keeping in a normal state for 24 hours. Then, the whiteness was measured after the test.

(9) Evaluation of Retention

Each of the transparent resin pellets as an evaluation subject and colored resin pellets obtained by adding 1 part of a red pigment "DYMIC MBR 155" (manufactured by Dainichiseika Color & Chemicals Mfg. Co., Ltd.) to 100 parts by a transparent resin pellet as an evaluation subject was prepared. First, the colored resin pellets were supplied to a 40 mmϕ non-vent screw type extruder (L/D=26) equipped with a T die with the width of 300 mm, and the inside of the T die was replaced with the colored resin. After terminating the supply of a raw material and performing extrusion until the end of discharge, the extruder was turned off and maintained for 30 minutes. Thirty minutes later, the transparent resin pellets were supplied to an extruder and a film with a thickness of 100 μm was formed. The operation conditions of a film forming machine include cylinder temperature of 200° C. to 240° C., T die temperature of 250° C., and cooling roll temperature of 70° C.

Sampling was made in order at a position which is 3 cm apart from the tip of the obtained film, and according to film thickness measurement and measurement of absorbance at 475 nm, the concentration of the colored resin as a previous resin was measured and the discharge amount at a time point at which the concentration of the previous resin is 0.5% or less at the tip is determined as a substitution resin amount based on the following equation.

Concentration of previous resin (%)=(Absorbance of sample/Film thickness×100−Absorbance of transparent resin)/(Absorbance of colored resin−Absorbance of transparent resin)×100

The absorbance of transparent resin and absorbance of colored resin each indicates the value measured for the film with a thickness of 100 μm.

(10) Measurement of Residual Sulfuric Acid Amount

For having the residual sulfuric acid amount, the polymer sample was dissolved in acetone and titration with barium acetate solution was performed by using sulfonazo III as an indicator.

(11) Measurement of Residual Metal Amount and Phosphorus Content

After dissolving the resin for measurement in nitric acid, quantification was made by using ICP spectrophotometric analyzer (IRIS Intrepid II XSP manufactured by Thermo). The measurement wavelength was as follows: 317.9 nm for calcium ions, 396.1 nm for aluminum and 213.6 nm for phosphorus.

(12) Elongation Test

Measurement was made on the basis of JIS K7127. The elongation speed was 50 mm/min, and as a measurement sample, a sample with the size of 100 mm×15 mm was used.

Preparation Example 1

Production of Rubber-Containing Multi-Stage Polymer Latex (I)

After adding 8.5 parts of deionized water to a vessel equipped with a stirrer, the monomer component consisting of 0.3 part of MMA, 4.5 parts of n-BA, 0.2 part of 1,3-BD, 0.05 part of AMA, and 0.025 part of CHP was added thereto and mixed under stirring at room temperature. After that, 1.1 parts of the emulsifying agent (1) were added under stirring to the above vessel and the stirring was performed for 20 minutes to produce an emulsion.

Next, 186.5 parts of deionized water were added to a polymerization vessel equipped with a condenser, and the temperature was raised to 70° C. Furthermore, 0.20 part of sodium formaldehyde sulfoxylate, 0.0001 part of ferrous sulfate, and 0.0003 part of EDTA were added to 5 parts of deionized water to prepare a mixture, and the mixture then added at once to the polymerization vessel. Subsequently, the prepared emulsion was added dropwise over 8 minutes to the polymerization vessel with stirring under nitrogen, and by allowing the reaction to occur for 15 minutes, a first elastic polymer (I-A-1) was obtained.

Subsequently, the monomer component consisting of 1.5 parts of MMA, 22.5 parts of n-BA, 1.0 part of 1,3-BD, and 0.25 part of AMA, was added dropwise, together with 0.016 part of CHP, to the polymerization vessel over 90 minutes and the reaction was continued for 60 minutes to obtain an elastic polymer (I-A) which contains a first elastic polymer (I-A-1) and a second elastic polymer (I-A-2). Meanwhile, Tg of the first elastic polymer (I-A-1) alone was −48° C. and Tg of the second elastic polymer (I-A-2) alone was −48° C.

Subsequently, the monomer component consisting of 6 parts of MMA, 4 parts of n-BA, and 0.075 part of AMA was added dropwise, together with 0.0125 part of CHP, to the polymerization vessel over 45 minutes and the reaction was continued for 60 minutes to form an intermediate polymer (I-B) on the top of the elastic polymer (I-A). Meanwhile, Tg of the intermediate polymer (I-B) alone was 20° C.

Subsequently, the monomer component consisting of 55.2 parts of MMA, 4.8 parts of n-BA, 0.19 part of n-OM and 0.08 part of t-BH was added dropwise to the polymerization vessel over 140 minutes and the reaction was continued for 60 minutes to form a hard polymer (I-C) on the top of the intermediate polymer (I-B). According to the above steps, 300 parts of the rubber-containing multi-stage polymer latex (I) containing 100 parts of the rubber-containing multi-stage polymer were obtained. Meanwhile, Tg of the hard polymer (I-C) alone was 84° C.

Furthermore, the average particle diameter of the rubber-containing multi-stage polymer measured after the polymerization was 0.12 μm.

Preparation Example 2

Production of Rubber-Containing Multi-Stage Polymer Latex (II)

After adding 8.5 parts of deionized water to a vessel equipped with a stirrer, the monomer component consisting of 0.3 part of MMA, 4.5 parts of n-BA, 0.2 part of 1,3-BD, 0.05 part of AMA, and 0.025 part of CHP was added thereto and mixed under stirring at room temperature. After that, 1.3 parts of the emulsifying agent (1) were added under stirring to the above vessel and the stirring was performed for 20 minutes to produce an emulsion.

Next, 136.5 parts of deionized water were added to a polymerization vessel equipped with a condenser, and the temperature was raised to 70° C. Furthermore, 0.20 part of sodium formaldehyde sulfoxylate, 0.0001 part of ferrous sulfate, and 0.0003 part of EDTA were added to 5 parts of deionized water to prepare a mixture, and the mixture then added at once to the polymerization vessel. Subsequently, the prepared emulsion was added dropwise over 8 minutes to the polymerization vessel with stirring under nitrogen, and by allowing the reaction to occur for 15 minutes, a first elastic polymer (II-A-1) was obtained.

Subsequently, the monomer component consisting of 6.9 parts of MMA, 14.4 parts of n-BA, 1.0 part of 1,3-BD, and 0.25 part of AMA, was added dropwise, together with 0.016 part of CHP, to the polymerization vessel over 90 minutes and the reaction was continued for 60 minutes to obtain the elastic polymer (II-A) which contains the first elastic polymer (II-A-1) and a second elastic polymer (II-A-2). Meanwhile, Tg of the first elastic polymer (II-A-1) alone was −48° C. and Tg of the second elastic polymer (II-A-2) alone was −20° C.

Subsequently, the monomer component consisting of 6 parts of MMA, 4 parts of MA, and 0.075 part of AMA was added dropwise, together with 0.0125 part of CHP, to the polymerization vessel over 45 minutes and the reaction was continued for 60 minutes to form an intermediate polymer (II-B) on the top of the elastic polymer (II-A). Meanwhile, Tg of the intermediate polymer (II-B) alone was 60° C.

Subsequently, the monomer component consisting of 57 parts of MMA, 3 parts of MA, 0.264 part of n-OM and 0.075 part of t-BH was added dropwise to the polymerization vessel over 140 minutes and the reaction was continued for 60 minutes to form a hard polymer (II-C) on the top of the intermediate polymer (II-B). According to the above steps, 250 parts of the rubber-containing multi-stage polymer latex (II) containing 100 parts of the rubber-containing multi-stage polymer were obtained. Meanwhile, Tg of the hard polymer (II-C) alone was 99° C.

Furthermore, the average particle diameter of the rubber-containing multi-stage polymer measured after the polymerization was 0.12 μm.

Preparation Example 3

Production of Rubber-Containing Multi-Stage Polymer Latex (III)

After adding 8.5 parts of deionized water to a vessel equipped with a stirrer, the monomer component consisting of 0.3 part of MMA, 4.5 parts of n-BA, 0.2 part of 1,3-BD, 0.05 part of AMA, and 0.025 part of CHP was added thereto and mixed under stirring at room temperature. After that, 0.7 part of the emulsifying agent (2) was added under stirring to the above vessel and the stirring was performed for 20 minutes to produce an emulsion.

Next, 136.5 parts of deionized water were added to a polymerization vessel equipped with a condenser, and the temperature was raised to 70° C. Furthermore, 0.20 part of sodium formaldehyde sulfoxylate, 0.0001 part of ferrous sulfate, and 0.0003 part of EDTA were added to 5 parts of deionized water to prepare a mixture, and the mixture then added at once to the polymerization vessel. Subsequently, the prepared emulsion was added dropwise over 8 minutes to the polymerization vessel with stirring under nitrogen, and by allowing the reaction to occur for 15 minutes, a first elastic polymer (III-A-1) was obtained.

Subsequently, the monomer component consisting of 6.9 parts of MMA, 14.4 parts of n-BA, 1.0 part of 1,3-BD, and 0.25 part of AMA, was added dropwise, together with 0.016 part of CHP, to the polymerization vessel over 90 minutes and the reaction was continued for 60 minutes to obtain an elastic polymer (III-A) which contains the first elastic polymer (III-A-1) and a second elastic polymer (III-A-2). Meanwhile, Tg of the first elastic polymer (III-A-1) alone was −48° C. and Tg of the second elastic polymer (III-A-2) alone was −20° C.

Subsequently, after adding 1.0 part of the emulsifying agent (2) to the vessel, the monomer component consisting of 6 parts of MMA, 4 parts of MA, and 0.075 part of AMA was added dropwise, together with 0.0125 part of CHP, to the polymerization vessel over 45 minutes and the reaction was continued for 60 minutes to form an intermediate polymer (III-B) on the top of the elastic polymer (III-A). Meanwhile, Tg of the intermediate polymer (III-B) alone was 60° C.

Subsequently, the monomer component consisting of 57 parts of MMA, 3 parts of MA, 0.264 part of n-OM and 0.075 part of t-BH was added dropwise to the polymerization vessel over 140 minutes and the reaction was continued for 60 minutes to form the hard polymer (III-C) on the top of the intermediate polymer (III-B). According to the above steps, 250 parts of the rubber-containing multi-stage polymer latex (III) containing 100 parts of the rubber-containing multi-stage polymer were obtained. Meanwhile, Tg of the hard polymer (III-C) alone was 99° C.

Furthermore, the average particle diameter of the rubber-containing multi-stage polymer measured after the polymerization was 0.14 μm.

Preparation Example 4

Production of Rubber-Containing Multi-Stage Polymer Latex (IV)

The rubber-containing latex (IV) was obtained in the same manner as Preparation Example 2 except that the emulsifying agent (3) is used instead of the emulsifying agent (1). The average particle diameter of the rubber-containing multi-stage polymer measured after the polymerization was 0.12 μm.

Preparation Example 5

Production of Rubber-Containing Multi-Stage Polymer Latex (V)

The rubber-containing latex (V) was obtained in the same manner as Preparation Example 1 except that the emulsifying agent (4) is used in an amount of 1.3 parts instead of 1.1 parts of the emulsifying agent (1).

Preparation Example 6

Production of Rubber-Containing Multi-Stage Polymer Latex (VI)

The rubber-containing latex (VI) was obtained in the same manner as Preparation Example 1 except that the emulsifying agent (5) is used in an amount of 1.3 parts instead of 1.1 parts of the emulsifying agent (1).

Examples 1 to 10

As a coagulating agent, 300 parts of an aqueous solution of aluminum sulfate or an aqueous sulfuric acid solution obtained by diluting conc. sulfuric acid or aluminum sulfate of which concentration has been adjusted to have the coagulating agent amount shown in Table 1 were added to a vessel, and the temperature was raised to 90° C. under stirring. Subsequently, each of the rubber-containing multi-stage polymer latex (I) to (IV) ((I); 300 parts, (II) to (IV); 250 parts for each) of the type shown in Table 1 was added continuously over 10 minutes to the vessel while it was simultaneously filtered through a nylon mesh with an opening size of 25 μm. After the addition, the temperature was raised to 95° C. and it was kept for 5 minutes. Next, the vessel was cooled to room temperature and the polymer was washed with deionized water. Next, the polymer was filtered and separated by centrifugal dehydration (1300 G, for 3 minutes) to obtain a polymer with white color. The moisture ratio of the polymer at that time was shown in Table 1. After that, the polymer was dried for 48 hours at 75° C. to obtain the rubber-containing multi-stage polymer (thermoplastic resin powder) in white powder state. The flow retention rate, and the contents of metal, phosphorus, and sulfuric acid in the obtained thermoplastic resin powder are described in Table 1. Meanwhile, in Examples 1 to 10, the metal corroding free acids were present at 500 ppm or less. Empty cells indicate that no measurement was made. Meanwhile, in Table 1, the amount of a coagulating agent indicates the amount relative to 100 parts of a polymer (herein, rubber-containing multi-stage polymer).

Next, the blending agent shown in Table 2 was added to the obtained rubber-containing polymer with multi-layer structure and, by mixing it using a Henschel mixer, a thermoplastic resin composition was obtained. The obtained thermoplastic resin composition was supplied to a vent type extruder (TOSHIBA MACHINE CO., LTD., TEM35-B) which has been heated to 230° C. followed by kneading to obtain pellets.

The pellets produced by the above method were dried for a whole day at 80° C. The dried pellets were supplied to a 40 mmφ non-vent screw type extruder (L/D=26) equipped with a T die with width of 300 mm to form films, each having a thickness of 50 μm and 75 μm. At that time, the conditions include the cylinder temperature of 200° C. to 240° C., the T die temperature of 250° C., and the cooling roll temperature of 70° C.

The total light transmission, haze value, and number of fish eyes of the formed acrylic resin film are shown in Table 2. Further, the results of the retention evaluation are shown in Table 2 and FIG. 1.

Comparative Examples 1 to 5

A thermoplastic resin powder was obtained in the same manner as Example 1 by using the latex and coagulating agent shown in Table 1. A film was formed in the same manner as Example 1 after adding the blending agent shown in Table 2.

The moisture ratio, flow retention rate, and content of metal, phosphorus, and sulfuric acid in the obtained thermoplastic resin powder are described in Table 1. Furthermore, the results of evaluating the obtained film are shown in Table 2. Furthermore, the results of the retention evaluation are shown in Table 2 and FIG. 1.

Reference Examples 1 to 5

A thermoplastic resin powder was obtained in the same manner as Example 1 by using the latex and coagulating agent shown in Table 1. A film was formed in the same manner as Example 1 after adding the blending agent shown in Table 2 to the obtained thermoplastic resin powder.

Figure 2:
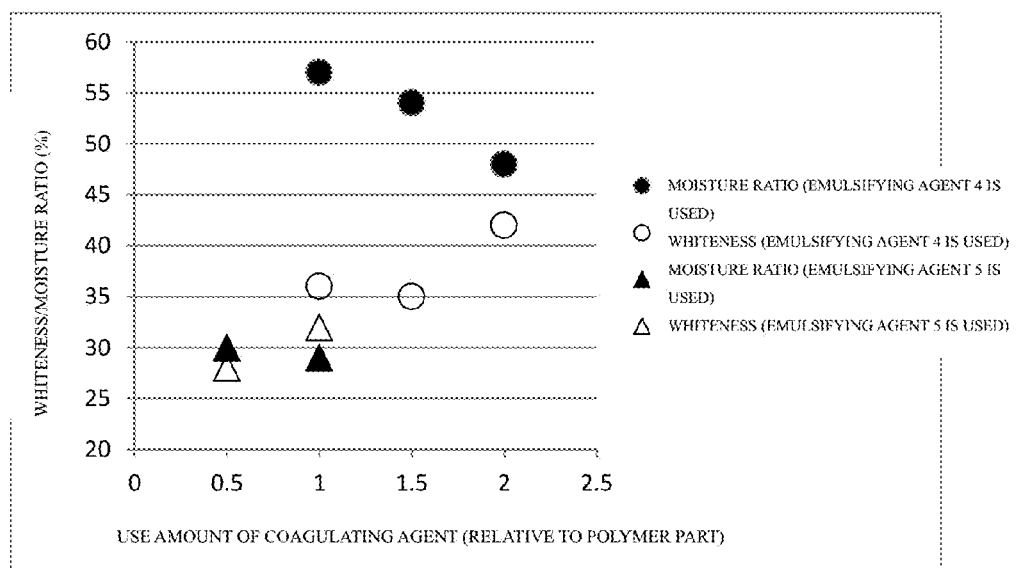
FIG. 2 is a graph illustrating the whiteness and moisture ratio when the emulsifying agents 4 and 5 are used.

The moisture ratio of the obtained thermoplastic resin powder is described in Table 1. Furthermore, the results of evaluating the obtained film are shown in Table 2 and FIG. 2.

TABLE 1

| | Latex | Emulsifying agent | Coagulating agent | Amount of coagulating agent (relative to polymer part) | Flow retention rate (%) | Moisture ratio (%) | Residual calcium (PPM) | Residual aluminum (PPM) | Residual phosphorus (PPM) | Amount of residual sulfuric acid (PPM) |
|---|---|---|---|---|---|---|---|---|---|---|
| Example 1 | I | (1) | Aluminum sulfate | 0.1 | 91% | 34% | <50 | 290 | 440 | — |
| Example 2 | I | (1) | Aluminum sulfate | 0.2 | 93% | 29% | — | Not measured | Not measured | — |
| Example 3 | I | (1) | Aluminum sulfate | 0.5 | 89% | 25% | <50 | 300 | 420 | — |
| Example 4 | II | (1) | Sulfuric acid | 2.0 | 78% | 23% | — | — | Not measured | Not measured |

TABLE 1-continued

|  | Latex | Emulsifying agent | Coagulating agent | Amount of coagulating agent (relative to polymer part) | Flow retention rate (%) | Moisture ratio (%) | Residual calcium (PPM) | Residual aluminum (PPM) | Residual phosphorus (PPM) | Amount of residual sulfuric acid (PPM) |
|---|---|---|---|---|---|---|---|---|---|---|
| Example 5 | III | (2) | Aluminum sulfate | 0.1 | 82% | 26% | <50 | 120 | <50 | — |
| Example 6 | III | (2) | Sulfuric acid | 1.0 | 87% | 19% | — | — | — | 200 |
| Example 7 | III | (2) | Sulfuric acid | 0.3 | 91% | 21% | — | — | — | 100 |
| Example 8 | III | (2) | Sulfuric acid | 0.1 | 101% | 44% | — | — | — | <100 |
| Example 9 | IV | (3) | Sulfuric acid | 0.1 | 97% | 36% | — | — | — | <100 |
| Example 10 | IV | (3) | Sulfuric acid | 0.3 | 90% | 20% | — | — | — | <100 |
| Comparative Example 1 | I | (1) | Aluminum sulfate | 0.02 | Impossible to coagulate | | | | | |
| Comparative Example 2 | I | (1) | Aluminum sulfate | 1.0 | 67% | 26% | <50 | 340 | 420 | — |
| Comparative Example 3 | II | (1) | Calcium acetate | 0.5 | Impossible to coagulate | | | | | |
| Comparative Example 4 | II | (1) | Calcium acetate | 1.0 | 73% | 41% | Not measured | — | Not measured | — |
| Comparative Example 5 | II | (1) | Calcium acetate | 3.5 | 40% | 22% | 630 | — | 420 | — |
| Reference Example 1 | V | (4) | Aluminum sulfate | 1 | — | 57% | — | Not measured | — | — |
| Reference Example 2 | V | (4) | Aluminum sulfate | 1.5 | — | 54% | — | Not measured | — | — |
| Reference Example 3 | V | (4) | Aluminum sulfate | 2 | — | 48% | — | Not measured | — | — |
| Reference Example 4 | VI | (5) | Aluminum sulfate | 0.5 | — | 30% | — | Not measured | Not measured | — |
| Reference Example 5 | VI | (5) | Aluminum sulfate | 1 | — | 29% | — | Not measured | Not measured | — |

TABLE 2

|  |  | Example 1 | Example 7 | Example 10 | Comparative Example 5 | Reference Example 1 | Reference Example 2 | Reference Example 3 | Reference Example 4 | Reference Example 5 |
|---|---|---|---|---|---|---|---|---|---|---|
| Thermoplastic resin powder (parts) | | 100 | 75 | 75 | 75 | 100 | 100 | 100 | 100 | 100 |
| Flow retention rate (%) | | 91% | 91% | 90% | 40% | — | — | — | — | — |
| LA-31RG (parts) | | 2.1 | 0 | 0 | 0 | 2 | 2 | 2 | 2 | 2 |
| TV234 (parts) | | 0 | 1.4 | 1.4 | 1.4 | 0 | 0 | 0 | 0 | 0 |
| LA-57 (parts) | | 0.3 | 0.3 | 0.3 | 0.3 | 0.3 | 0.3 | 0.3 | 0.3 | 0.3 |
| Irg1076 (parts) | | 0.1 | 0.1 | 0.1 | 0.1 | 0.1 | 0.1 | 0.1 | 0.1 | 0.1 |
| VH (parts) | | 0 | 25 | 25 | 25 | 0 | 0 | 0 | 0 | 0 |
| Film thickness (μm) | | 50 | 75 | 75 | 75 | 50 | 50 | 50 | 50 | 50 |
| MD direction | Tensile strength (MPa) | 34 | 48 | 48 | 47 | — | — | — | — | — |
| | Tensile modulus (MPa) | 1310 | 1520 | 1480 | 1380 | — | — | — | — | — |
| | Elongation rate at break (%) | 108 | 94 | 114 | 82 | — | — | — | — | — |
| TD direction | Tensile strength (MPa) | 34 | 48 | 49 | 47 | — | — | — | — | — |
| | Tensile modulus (MPa) | 1280 | 1560 | 1520 | 1400 | — | — | — | — | — |
| | Elongation rate at break (%) | 97 | 109 | 80 | 22 | — | — | — | — | — |
| After hot water test (condition 1) | Total light transmittance (%) | 92.5 | 92.7 | 92.3 | 92.4 | — | — | — | — | — |
| | Haze value | 1.8 | 0.7 | 0.7 | 0.8 | — | — | — | — | — |
| | Whiteness | 15.8 | 15.4 | 14.5 | 15.0 | — | — | — | — | — |
| After hot water test (condition 1) | Total light transmittance (%) | 91.8 | 91.9 | 91.8 | 92.4 | — | — | — | — | — |
| | Haze value | 3.0 | 1.6 | 1.7 | 1.0 | — | — | — | — | — |
| | Whiteness | 17.9 | 16.8 | 16.2 | 15.4 | — | — | — | — | — |
| After hot water test (condition 2) | Whiteness | — | — | — | — | 36 | 35 | 42 | 28 | 32 |
| Substitution resin amount (kg) | | — | 2.4 | — | 2.9 | — | — | — | — | — |
| Fish eye (number/m$^2$) | | 8 | 0 | 17 | 83 | — | — | — | — | — |

From the above Examples and Preparation Examples, the followings were clearly found.

The rubber-containing multi-stage polymer obtained from Examples 1 to 10 has excellent flow retention rate so that the decrease in fluidity was minor even when the heating time was long. As such, even when a thermoplastic resin composition containing this rubber-containing multi-stage polymer is extruded by an extruder, it was unlikely to have retention and degradation of the thermoplastic resin was suppressed so that an occurrence of fish eyes resulting from thermally decomposed product does not easily occur. In particular, in Examples 1, 7, and 10, there were only few fish eyes resulting from thermally decomposed resin, and thus a film with excellent appearance was obtained. Furthermore, in Example 7, as only a small amount of substitution resin is required, easy substitution can be achieved during resin change or the like, and thus the productivity is improved.

Furthermore, when a thermoplastic resin composition containing the rubber-containing multi-stage polymer obtained from Examples 1 to 10 is molded, incorporation of degraded resin into a molded product is suppressed, and thus it was possible to obtain a molded product with excellent appearance. Furthermore, as the moisture ratio is low during coagulation, the drying efficiency is high so that the thermoplastic resin powder obtained by the method of the present invention has a high industrial usefulness.

Meanwhile, in Comparative Example 1, the amount of the coagulating agent was less than 0.03 part relative to 100 parts of the polymer, and thus poor coagulation was yielded and it was impossible to obtain the polymer.

In Comparative Example 2, the amount of the coagulating agent was more than 0.9 part relative to 100 parts of the polymer, and thus the obtained polymer has low flow retention rate. Furthermore, since a calcium salt was used as a coagulating agent in Comparative Examples 4 and 5, there was high calcium content in the obtained thermoplastic resin powder. For such reasons, the flow retention rate was low. Accordingly, it was easier to have retention in an extruder so that the thermoplastic resin is easily degraded. Furthermore, when the degraded resin is incorporated to a molded product, the molded product shows poor appearance. In Comparative Example 5, in particular, there were lots of fish eyes resulting from thermally decomposed resin, and thus a film with poor appearance was yielded. Furthermore, as the substitution resin amount was also high in Comparative Example 5, lots of time and discharge resins are required for substitution like resin change or the like, and thus the productivity is lowered.

In Comparative Example 3, since calcium acetate was used as a coagulating agent, poor coagulation occurred when the amount of the coagulating agent was 0.5 part relative to 100 parts of the polymer. Thus, it was impossible to obtain the polymer.

Compared to Examples 5 in which aluminum sulfate is used as a coagulating agent, Example 6 in which sulfuric acid is used shows more favorable flow retention rate even though it has lower moisture ratio than Example 5.

The emulsifying agent 4, which is a sulfonic acid-based emulsifying agent, is used in Reference Examples 1 to 3. Thus, compared to cases as Reference Examples 4 and 5 in which the emulsifying agent 5 as a phosphoric acid emulsifying agent is used, it shows higher moisture ratio so that the coagulating agent needs to be used in a large amount. In this regard, as the use amount of the coagulating agent increases, the whiteness after hot water whitening test of a thermoplastic resin composition, in which the thermoplastic resin powder is used, also increases. In this regard, by using a thermoplastic resin composition containing the thermoplastic resin powder in which a phosphoric acid-based emulsifying agent is used, a molded product with excellent hot water whitening resistance can be obtained.

The invention claimed is:

1. A thermoplastic resin powder obtained by coagulating a polymer from a latex produced by means of emulsion polymerization of a monomer, in which the content of metal corroding free acids in the thermoplastic resin powder is no greater than 500 ppm, and the thermoplastic resin powder satisfies the following Formula (1):

$$75 \leq \text{flow retention rate } (\%) \leq 200 \quad (1)$$

with the proviso that the above flow retention rate is defined by $(MFR_{20}/MFR_4) \times 100$, wherein:

$MFR_{20}$ indicates melt flow rate after maintaining for 20 minutes at conditions including 250° C. and a load of 49 N, $MFR_4$ indicates melt flow rate after maintaining for 4 minutes at conditions including 250° C. and a load of 49 N, and the thermoplastic resin powder does not contain butadiene as a copolymerization component.

2. The thermoplastic resin powder according to claim 1, wherein the resin powder satisfies the following Formula (2):

$$90 \leq \text{flow retention rate } (\%) \leq 120 \quad (2).$$

3. The thermoplastic resin powder according to claim 1, wherein the monomer contains (meth)acrylic acid ester at 50 to 100% by mass.

4. The thermoplastic resin powder according to claim 1, wherein calcium content is less than 50 ppm.

5. The thermoplastic resin powder according to claim 4, wherein sum of the calcium content and magnesium content is less than 50 ppm.

6. The thermoplastic resin powder according to claim 1, wherein aluminum content is 60 ppm or more and 300 ppm or less.

7. The thermoplastic resin powder according to claim 1, wherein phosphorus content is 50 ppm or more.

8. The thermoplastic resin powder according to claim 1, wherein the polymer is coagulated by a coagulating agent selected from the group consisting of sulfuric acid, nitric acid, hydrochloric acid, acetic acid, aluminum sulfate, magnesium sulfate, sodium sulfate, sodium nitrate, aluminum chloride, calcium chloride, sodium chloride, potassium acetate and sodium acetate.

9. The thermoplastic resin powder according to claim 8, wherein the coagulating agent is present in an amount of 0.03 to 2.0 parts by mass relative to 100 parts by mass of the polymer.

10. The thermoplastic resin powder according to claim 8, wherein the coagulating agent is aluminum sulfate.

11. The thermoplastic resin powder according to claim 10, wherein the aluminum sulfate is present in an amount of 0.03 to 0.9 parts by mass of the polymer.

12. A resin molded product obtained by molding a thermoplastic resin composition which contains the thermoplastic resin powder according to claim 1.

13. The resin molded product according to claim 12, wherein the resin molded product has a film shape.

* * * * *